Figure 1:
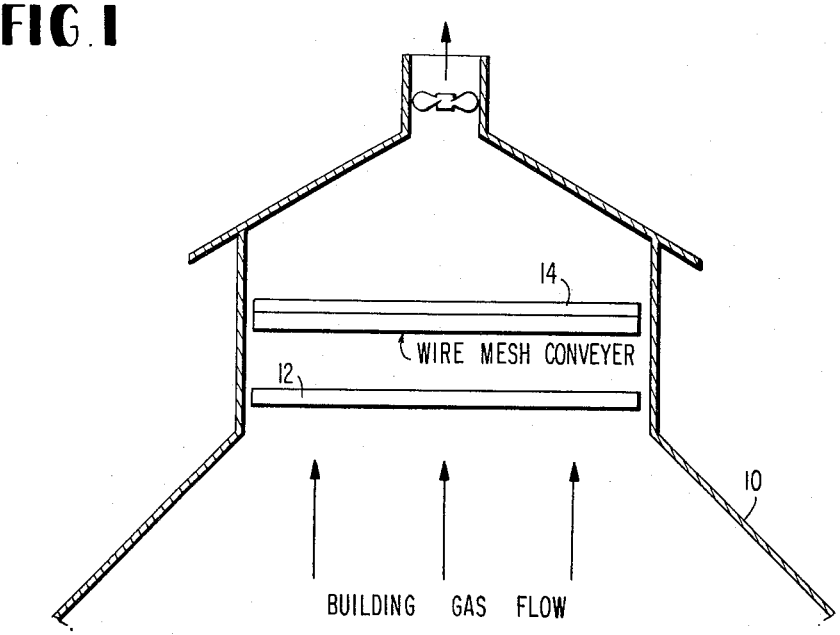

United States Patent [19]
Teller

[11] 3,773,633
[45] Nov. 20, 1973

[54] PROCESS FOR RECOVERING GASEOUS HF FROM GASEOUS EFFLUENTS

[75] Inventor: Aaron J. Teller, Great Neck, N.Y.

[73] Assignee: Wellman-Lord, Inc., Lakeland, Fla.

[22] Filed: Mar. 13, 1970

[21] Appl. No.: 19,381

Related U.S. Application Data

[63] Continuation-in-part of Ser. No. 757,556, Sept. 5, 1968, abandoned.

[52] U.S. Cl. .............. 204/67, 204/245, 23/2 S, 23/153
[51] Int. Cl. .............. C22d 3/12, C01d 7/22
[58] Field of Search............ 204/67, 246, 243, 204/244, 245, 247; 23/2 R, 2 S, 153, 88; 252/192

[56] References Cited
UNITED STATES PATENTS

| | | | |
|---|---|---|---|
| 2,919,174 | 12/1959 | Pring | 23/153 X |
| 2,934,405 | 4/1960 | Schmidl | 23/153 X |
| 3,322,659 | 5/1967 | Paguet | 204/67 |
| 3,470,075 | 9/1969 | Johnson | 204/67 |
| 3,503,184 | 3/1970 | Knapp et al. | 23/88 X |

Primary Examiner—John H. Mack
Assistant Examiner—D. R. Valentine
Attorney—John W. Behringer, Eugene L. Bernard, Martin J. Brown, James N. Dresser, W. Brown Morton, Jr., John T. Roberts, Malcolm L. Sutherland and Morton, Bernard, Brown, Roberts & Sutherland

[57] ABSTRACT

Hydrogen fluoride is recovered from gases by contacting the gases with alumina pretreated with NaOH, KOH or their mixture.

23 Claims, 2 Drawing Figures

PATENTED NOV 20 1973 3,773,633

PROCESS FOR RECOVERING GASEOUS HF FROM GASEOUS EFFLUENTS

This application is a continuation-in-part of application Ser. No. 757,566, filed Sept. 5, 1968, now abandoned.

This invention relates to a process for recovering gaseous hydrogen fluoride (HF) from gases in an efficient and expeditious manner by contacting the gas with alumina pretreated with NaOH, KOH or their mixture.

An aspect of the present invention is directed to the recovery of gaseous HF in waste gases produced in the manufacture of aluminum by the electrolytic process wherein alumina is dissolved in molten cryolite ($Na_3AlF_6$) which is a double fluoride of sodium and aluminum, and is electrolyzed with direct current. The vessel containing the mixture of alumina dissolved in cryolite can be carbon-lined to act as a cathode and carbon rods or blocks can be immersed in the mixture to form an anode. The use of a current results in the release of oxygen from the alumina to the deposition of the oxygen on the anode, which is burned, while the molten aluminum is deposited on the cathode. The molten aluminum, which is heavier than molten cryolite at the operating temperatures, generally from about 900° to 1,100°C., accumulates on the bottom of the vessel and is recovered.

Gases resulting from the electrolytic process contain HF which is deleterious to health and is considered an air pollutant. However, its recovery as a fluorine value is also desirable. Accordingly, in this aspect of the present invention, the HF in the waste gas produced during the manufacture of aluminum is recovered using alumina pretreated with NaOH or KOH, the waste gas, substantially free of HF, can be vented to the atmosphere, the fluorine value is recovered, and, as another advantageous feature of the present invention, the pretreated alumina used to recovere the HF when spent can also be used as at least a portion of the source for the feed utilized in the electrolytic process. Moreover, the efficiency of the present process can provide for economy in processing the waste gas when the furnace is housed in a building (normally the case) since the gas can be processed through the pretreated alumina without a substantial pressure drop.

The gases resulting from the electrolytic process also contain particulates, e.g. aluminum fluoride, sodium fluoride, alumina and cryolite particulates, and when using unbaked electrodes, tar particulates. In a modification of this aspect of the present invention, the gases are preliminarily scrubbed, e.g. by inertial impact means, to remove the particulates before they are placed in contact with the pretreated alumina.

The alumina employed in the process of the present invention is advantageously activated alumina in the form of discrete particles, generally of a size of about 1 to 20 or 500 mesh (Tyler screen-scale sieves).

Alumina, as porous alumina oxide, either in an anhydrous or calcined form, or as an aluminum oxide hydrate, or aluminum hydroxide, is widely employed in the primary aluminum production as well as throughout the chemical and petroleum industries. Various physical modifications of alumina are known as pot line alumina or activated alumina of commerce, and are especially employed for their pronounced catalytic activity and adsorptive capacity. The various physical modifications of high temperature calcined alumina are commonly known as alpha-alumina, theta-alumina, gamma-alumina, and eta-alumina; in addition, they may be designated as bayerite, boehmite and gibbsite, etc., when they are prepared or occur as low temperature forms and also commercially as various forms of pot line alumina called activated, low-alpha, high-alpha and calcined pot line aluminas.

The alumina is pretreated, e.g. impregnated or coated, with a component such as NaOH, KOH or their mixture, preferably by impregnating the alumina with an aqueous solution containing generally from about 1 to 50 weight percent of the component, preferably from about 4 to 30 weight percent under ambient conditions. The amount of water used in the solution is sufficient to impregnate and coat the alumina with amounts of the component sufficient to enhance the HF recovering character while substantially maintaining the free-flowing character of the alumina particles. Generally, the alumina is coated with from about 4 to 30, preferably from about 5 to 15, parts by weight of the component per 100 parts by weight of alumina using a solution generally containing from about 1 to 50, preferably 4 to 30 weight percent, of the component. A statistical monomolecular to termolecular coating is preferred. The alumina impregnated and coated with the aqueous solution of the component is advantageously dried, for instance by heating it at a temperature from about 25° to 100°C. for a period of 30 to 600 minutes to remove a portion of the residual water.

The pretreated alumina is advantageously employed in the form of a bed (e.g. fixed, moving or fluidized) of alumina particles, a bed generally from about 0.5 or 1 to 8 inches in depth, through which the HF-containing waste gas is processed. The HF containing gas is contacted with the alumina at a temperature generally from about 10° to 100°C., preferably from about 15° to 70°C., and at a superficial velocity sufficient to penetrate into, through and permit the pretreated alumina to remove the HF from the gas, generally at a superficial velocity of 0.1 or 0.5 to 5 feet per second (fps). This is continued until the efficacy of the pretreated alumina to remove HF is significantly reduced or breakthrough occurs. Breakthrough is a function of (1) the concentration of HF, (2) the amount of component on the surface of the alumina, (3) the velocity of gas, (4) the thickness of the bed of alumina, and (5) the average particle size of the alumina. As a guideline, when the concentration of HF is 50 ppm, the velocity of the gas is 2 feet per second, the bed is 3 inches thick containing 8 parts NaOH, KOH or their mixtures /100 parts of alumina, and the average particle size is about 10 mesh, then breakthrough occurs in about 109 hours.

The alumina, for instance containing less than about 0.05 wt. percent silica, prior to use in the process of the present invention, advantageously can be agglomerated to provide agglomerates of alumina having desirable crushing strength, particularly when it is destined to be employed under the mechanical stress conditions normally encountered in commercial operations. It was surprisingly found that a reproducible agglomeration product can be prepared using pot line alumina such as activated pot line alumina, low alpha-alumina and calcined pot line alumina by mixing alumina particles of a mesh size generally from less than about 100 to 500 mesh, with NaOH solution; heating the mixture in a sealed vessel (e.g. autoclave) to impregnate or coat the particles with the solution at a temperature generally from about 120° to 200°C., preferably from about 140° to 180°C. under autogenous pressure for a period of time sufficient to cohere and substantially uniformly heat the particles and this will generally range from about 50 to 300 minutes, usually from about 100 to 150 minutes, and then unsealing the vessel to recover the agglomerate. It is preferable, after unsealing the vessel and removing the agglomerate to size it, e.g. break and sieve it or extrude it, into desired particle sizes, e.g., 1 to 20 mesh and advantageously in groups of 4 to 8, 6 to 16 or 14 to 20 mesh; and then heat the sized discrete particles to remove free water, e.g. to about 100°C. Alumina particles of a size larger than those generally employed as starting material in this agglomeration process can be ground to the desired size. The discovery of this agglomeration process for the pot line aluminas, i.e., activated, calcined and low alpha-alumina was particularly surprising since the use of high alpha-alumina failed to provide an acceptable agglomerate. Moreover, it advantageously provides alumina agglomerate treated with NaOH of good mechanical strength while at the same time having high HF absorbing capacity which is particularly advantageous for use in processes directed to the recovery of HF, e.g., HF produced in the manufacture of aluminum by the electrolytic process. The use of KOH solution in place of or in combination with NaOH solution is also contemplated.

The present invention can be incorporated in three alternates for HF recovery in typical plants for the production of aluminum since there are two streams of effluents that should be tested from the aspects of pollution abatement and of recovery of fluorine value. Both streams may be treated separately or preferably, in a single recovery system for economy. The two systems are the skirt or hood system gas containing amounts of HF generally ranging up to 800 ppm in the skirt system and up to 150 ppm in the hood system, and the building flow system gas containing amounts of HF generally ranging from about 2 to 5 ppm.

Both streams contain particulates and have been treated separately. The smaller stream, the skirt or hood system stream, can be scrubbed with water and neutralized to form cryolite that can be fed to the pots. It is difficult to recover HF in the building gases because of the large volumes of air (generally up to 2.5 $\times 10^6$ cfm per operation of building) and low concentrations of fluoride (2 to 5 ppm fluoride) contained therein. Thus, the emission of building gases provides a major air pollution problem.

One procedure, Procedure I, is to use a cross-flow scrubber means for recovery of HF in the hood or skirt gas and a continuous dry selective solid phase recovery system means for recovery of HF in the building air. In this procedure, the hood gases after proceeding through dry cyclones, can be processed through four cross-flow scrubbers, for instance as described in U. S. Pat. No. 3,324,630 (herein incorporated by reference), each capable of handling, for instance, about 107,500 ACFM at 200°F. The liquid consumption is about 800 gpm. at 2 psig. per scrubber, the pressure drop is about 3 inches water gauge (w.g.), and the recovery of cryolite is obtained from the liquid effluent. The building air then proceeds to a dry recovery system built into a monitor with the recovered fluorine product being recycled directly to the pots. The pressure drop of the building air through the chromatographic bed is in the range of about 1 to 2 inches w.g.

Procedure II involves treating the hood or skirt gas and building air separately in continuous dry HF-selective chromatographic recovery units. When using Procedure II, the pressure drop is about 1 to 2 inches w.g.

Procedure III involves treating both the hood or skirt gas, and building air, together in continuous dry HF-selective solid phase recovery system. This procedure obviates the necessity for hoods, with all gates proceeding to the monitor where the gaseous fluorides and particulates are recovered by the dry selective solid phase recovery system. The pressure drop is in the range of about 1 to 2 inches w.g. In all procedures, the reusable larger particles of alumina, cryolite and fluoride values can be returned to the process.

The following examples will serve to illustrate the present invention but are not to be considered limiting.

The present invention can also be conducted by using the pretreated alumina particles in a bag filter arrangement. In this arrangement, alumina particles of a size less than about 100 mesh are blown into a gas stream which is conducted into a fabric dust collector and through a fabric filter on the surface of which the alumina particles form a permeable layer. Th following gas stream containing HF is contacted with the layer, the HF is captured by the layer, and the gas stream free of HF can be discharged to the atmosphere.

EXAMPLE I

The following example will be used in conjunction with FIG. I of the drawing to illustrate an embodiment of the present invention directed to the recovery of gaseous HF from combined building air and hood (or skirt) gas streams containing in general about 4 to 30 ppm F as HF. These waste gas streams are produced in a furnace for the manufacture of aluminum by an electrolytic process in building 10 and contain as particulates, 1 to 10 weight percent tars, 20 to 35 weight percent of fluoride-containing solids, 55 to 79 weight percent alumina with total solids loading ranging generally between 0.5 to 50 milligrams per cubic foot. The gas streams are conducted through the lower portion of the wire mesh belt 12, where substantial amounts of the particulates (tars, alumina, cryolite) are captured by inertial impact. The HF-containing gas, substantially free of particulates, is conducted to and through a 2 inch bed of alumina particles of a size of 10 to 14 mesh, supported on the upper portion of the 2 inch thick wire mesh conveyor 14 which particles are impregnated with a solution of NaOH. The gas is at a temperature of 28° to 60°C. and has a superficial velocity of 2 fps through the bed, substantial amounts of the HF are removed from the gas, the pressure drop of the gas through the bed of alumina is 1-½ inch w.g. and it is vented to the atmosphere through a fan as shown. The NaOH impregnated alumina is prepared by immersing 100 gms. of alumina in 60 cc. of water containing 8 gms. of NaOH. The belt moves at a rate of 4 to 10 feet per hour. The solid product containing the recovered fluoride values is returned to the electrolytic furnaces as replacement for part of the both necessary cryolite and alumina charges. It is continuously replaced by a new charge of NaOH-impregnated alumina to remove HF from the waste gases formed in the furnace.

EXAMPLE II

Figure 2:
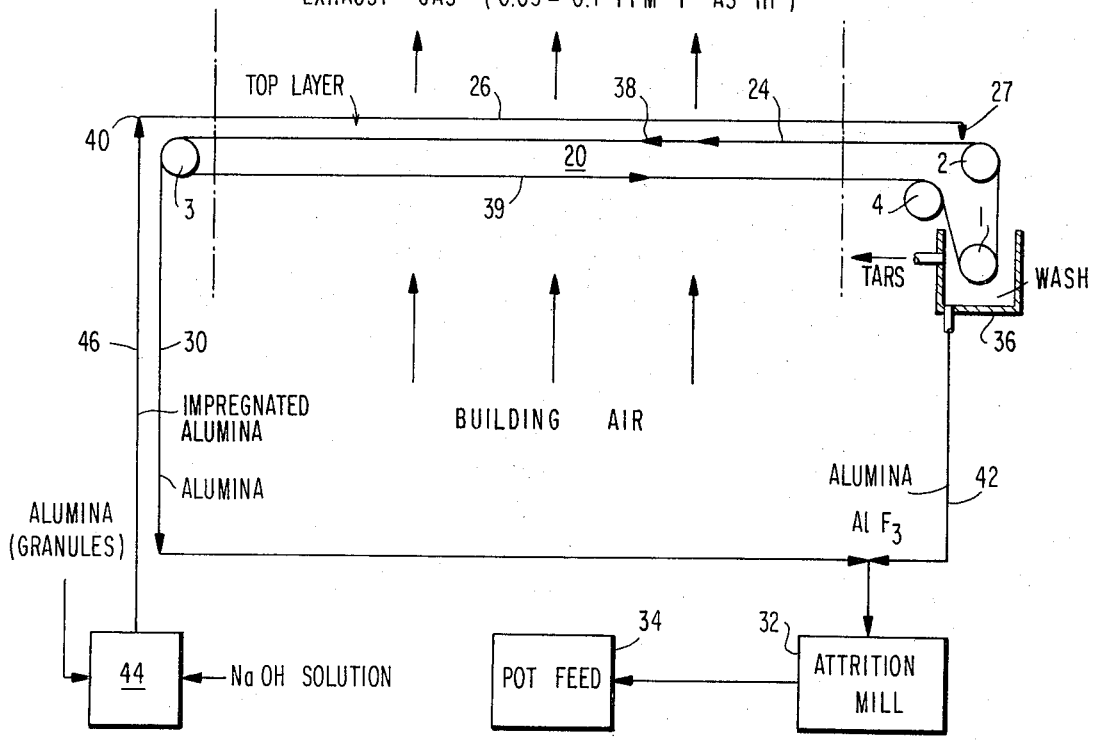

The following example will be used in conjunction with FIG. 2 of the drawing to illustrate a modification of the embodiment of Example I adapted to a building monitor system having a belt system 20 consisting of woven wire mesh 24 which is 2 inches thick and upon the upper portion 24 of which is supported a 2 inch layer of alumina (4–12 mesh) impregnated with 12 gms. of NaOH per 100 gms. of alumina and fed to the belt by conduit 26 at point 27. The belt is kept taut by a series of tightening or adjusting rolls 1, 2 and 3 and is powered by power roll 4.

The belt (consisting of 8 ft. widths) is 16 feet wide and 1,000 feet long, thus occupying over 90 percent of the width of the monitor. The thickness of the bed is 2 inches with the belt running at one-third fpm. HF is recovered in substantial amounts. The particulates are also recovered in substantial amounts by the woven wire mesh belt.

As the belt reaches the end of the building indicator at 40, the solids supported by the belt drop and are conducted by conduit 30 through attrition mill 32 and into the pot feed material handler 34. The belt is continuously washed with hot water containing surfactant, e.g. alkyl benzene sulfonate, to remove tars and other particulates in tray 36, either at the end of the building or at intermediate points, and returns as shown by the direction of flow at 38 to the monitor proceeding to the other end of the building indicated at 40.

The tars and particulates separate on cooling the wash solution, with tars returned to anode manufacture and the alumina and fluoride bearing particulates to the pot feed material by way of conduit 42 as shown.

The returning belt 39 acts as a particulates collector. The belt on returning to the outer end of the building is covered with 2 inch layer of the absorbing material and returns to process. NaOH-impregnated alumina prepared at 44, is conducted by way of conduit 46 to belt section 24 at point 27 in amounts sufficient to maintain a 2 inch layer of the NaOH-impregnated alumina on the belt. All water pumping is circumvented and all the pollutants recovered are returned to process. It is possible to obviate the need for a skirt or hood system and using the proposed system to treat the entire gaseous effluent from the manufacture of aluminum.

The following presents test results showing the surprising results provided when using pretreated alumina in accordance with the present invention.

One test involved removal of HF from air by passing the gas through a NaOH-impregnated alumina bed in a five-eighths inch i.d. polyethylene tube filled to a depth of 2.7 inches. Commercially available 10–16 size mesh activated alumina was used. Two concentrations of NaOH on alumina were used; 8 gms. NaOH per 100 gms. alumina and 12 gms. NaOH per 100 gms. alumina. The deposition of the 8 gms. NaOH per 100 gms. alumina represents a statistical monomolecular layer. Tests were conducted on alumina impregnated with the two concentrations and also on unimpregnated alumina at a superfical velocity of 2 feet per second, at inlet concentrations of 20 ppm and 50 ppm HF. The temperature was 70°–80°F. The HF was fed to the system by bubbling a portion of the air feed through a 6 percent HF aqueous solution. In both concentrations of NaOH-impregnated alumina, the capacity far exceeded that anticipated for the stoichiometric reaction to form sodium fluoride. In addition, it was observed that the alumina had considerable aborptive capacity for HF.

Effluent levels prior to breakthrough did not exceed 0.05 ppm except for the first hour of run when up to 0.5 ppm was observed. Prior tests provided effluents less than 0.5 ppm at startup. The basic difference was that the entire air stream was bubbled through an HF aqueous solution in these first tests and only approximately 10 percent of the total air was bubbled through the more concentrated HF aqueous solution in these latter tests. Thus, the humid content of the air was significantly lower in this series of runs. Until sufficient water was adsorbed by the alumina or water was formed in the chemical reaction process, the rate of reaction was restricted. As soon as sufficient water was adsorbed, or formed the efficiency rose to its plateau value.

With untreated alumina at 51.4 ppm HF, breakthrough occurred after 37 hours, whereas with alumina treated with 12 pts. NaOH/100 pts. alumina, breakthrough occurred after 42 hours and with alumina treated with 8 pts. NaOH/100 pts. alumina, breakthrough occurred after 103 hours. Thus, it was determined that untreated alumina had a breakthrough recovery capacity of 36 percent of the maximum achieved with NaOH coated alumina beds at 50 ppm HF feed. At 20 ppm HF, the breakthrough with 12 pts. NaOH/100 pts. alumina was 26 hours in one run and with 8 pts. NaOH/100 pts. alumina, it was 109 hours.

Another test involved the conducting of HF-containing gas with nitrogen through 200 mesh NaOH-impregnated alumina in a five-eighths inch i.d. tube, the height of the impregnated alumina bed being 6-½ inches. A solution of 12 g. of NaOH dissolved in 80 ml. of water was added to 100 g. of the dry alumina to prepare the impregnated alumina bed in the column. The source of HF was a 5 percent aqueous solution of HF through which was bubbled $N_2$ gas. The input gas stream contained 4 ppm of HF. When 1000 l. of gas stream was passed through the NaOH-impregnated alumina at a rate of 30 l./min., the HF content of the effluent gas mixture dropped to less than 0.05 ppm.

EXAMPLES III and IV

The process of Example I is essentially followed in these Examples except the solid phase recover system indicated for the specific Example is used instead of NaOH-impregnated alumina.

| Example | Solid Phase Recovery System |
|---|---|
| III | KOH-impregnated alumina |
| IV | NaOH/KOH-impregnated alumina. |

EXAMPLE V

This will serve to illustrate the preparation of agglomerated alumina in accordance with another aspect of the present invention. The agglomerated alumina can be sized and used in the procedure set forth in Example I supra, for instance. The following Table, Table I, sets forth data on the various aluminas used. The abbreviation "LOI" refers to the Loss on Ignition value of the porous alumina and is essentially a measure of the combined water content or water of hydration and is dependent upon the temperature at which alumina hydrate was calcined or heated to produce alumina.

TABLE I

| Sample No. | Sample description | Sample weight (lbs.) | Alpha phase (percent) | LOI (percent) | Surface area (m.²/gm.) | Screen analysis weight percent coarser than— | | | | | Na₂O (percent) | SiO₂ (percent) | Fe₂O₃ (percent) |
|---|---|---|---|---|---|---|---|---|---|---|---|---|---|
| | | | | | | 100 mesh | 200 mesh | 325 mesh | −325 mesh | | | | |
| 1 | Metallurgical alumina; high alpha | 10 | 50 | 0.43 | 18.0 | 4.2 | 58.9 | 94.7 | 5.3 | 0.47 | 0.012 | 0.038 |
| 2 | Metallurgical; low alpha | 10 | 10 | 1.39 | 102.0 | 4.0 | 53.9 | 95.0 | 5.0 | 0.29 | 0.013 | 0.039 |
| 3 | RC-23 | 10 | 88 | 0.41 | 4.2 | 12.5 | 91.4 | 99.2 | 0.8 | 0.27 | 0.016 | 0.015 |
| 4 | Experimental lab produced, low alpha | 5 | 0 | 5.37 | 285.0 | 2.3 | 49.4 | 89.7 | 10.3 | 0.49 | 0.009 | 0.035 |

The four alumina samples were ground overnight in a ball mill and various sieve factions were mixed together to obtain the following standard size distribution for each of the four samples of aluminas:

| Mesh No. | Weight % |
|---|---|
| −100+150 | 15 |
| −150+200 | 45 |
| −200+250 | 20 |
| −250 | 20 |

The grinding in addition to reducing the particle size also exposed the inner surfaces of alumina powders. All the four alumina samples felt smooth after grinding. The calcined alumina (least strong of all the four aluminas) was talc-like and adhered strongly to the walls of the ball mill. The following are the capacity for water adsorption for 100 gms. of the standard aluminas:

| Material | cc |
|---|---|
| Activated | 60 |
| Low-alpha | 57 |
| High-alpha | 56 |
| Calcined | 42 |

Each of the ground alumina samples, samples 1, 2, 3 and 4, was agglomerated in capped and valved stainless steel pipes. The standard alumina powder was mixed with appropriate caustic solution made in its "capacity water" plus 3 cc. extra water (3 cc. for 50 gms. of alumina) in the pipe unit. The entire mass was kept in a hot oil bath and 3 cc. water were distilled over in order to establish removal of air in the pipe bomb. The valve was then closed and the mass was heated in the sealed bomb for 2 hours at 150° to 180°C. (the temperature of the alumina mass) after attaining the appropriate bath temperature.

After heating, the valve was opened slowly and the mass was dried at 100°C. to free the water. Table II shows the results of agglomeration where the strength was checked by crushing the particle and was given a rating, i.e., good or poor.

TABLE II.—CRUSH STRENGTH TEST RESULTS

| Weight ratio NaOH/Al₂O₃ | Temp., °C. | Acceptable—good | | | | Not acceptable—poor | | | |
|---|---|---|---|---|---|---|---|---|---|
| | | Act. | Low—α | High—α | Calc. | Act. | Low—α | High—α | Calc. |
| 8/100 | 105 | | | | ✓ | × | × | × | |
| | 125 | | | | ✓ | × | × | × | × |
| | 155 | ✓ | ✓ | | ✓ | | | × | |
| | 155 | ✓ | | | ✓ | | × | × | |
| | 180 | ✓ | ✓ | | | | | × | × |
| 10/100 | 180 | N.A. | ✓ | | | N.A. | | × | × |

It is claimed:

1. A process for removing gaseous HF from gas containing it comprising passing the gas containing HF through a support material consisting essentially of a grouping of activated alumina particles of about 1 to 20 mesh size and containing alumina surface coated with from about 4 to 30 parts of component per 100 parts of alumina, the component being selected from the group consisting of NaOH, KOH and their mixtures.

2. The process of claim 1 wherein the gas is conducted through support material comprised of about 4 to 30 parts of NaOH per 100 parts of alumina.

3. The process of claim 1 wherein gas is conducted through support material comprised of about 5 to 15 parts of NaOH per 100 parts of alumina.

4. The process of claim 3 wherein the gas is at a temperature of about 15° to 70°C. and the support material is a bed of particles from about 1 to 8 inches in depth.

5. The process of claim 4 wherei n the gas contacts the support material at a superficial velocity from about 0.1 to 5 feet per second.

6. The process of claim 5 wherein the gas contains particulates and is preliminarily processed through particulate removing means to remove particulates.

7. A process for removing gaseous HF from gas containing it comprising passing the gas evolved from the manufacture of aluminum by the electrolytic process and containing HF, in contact with a solid material consisting essentially of alumina particles containing about 4 to 30 parts of a member selected from the group consisting of NaOH, KOH and their mixtures, per 100 parts of alumina.

8. A process for removing gaseous HF from gas containing it comprising contacting the gas containing HF with a support material consisting essentially of alumina particles surface coated with from about 4 to 30 parts of a component per 100 parts of alumina, said component being selected from the group consisting of NaOH, KOH and their mixtures, said HF-containing gas being evolved from the manufacture of aluminum by the electrolytic process, and introducing the support material, when spent, into the electrolytic bath of said electroytic process.

9. The process of claim 8 wherein the support material contains about 5 to 15 parts of NaOH per 100 parts of alumina.

10. The process of claim 9 wherein the support material contains a statistical monomolecular layer of NaOH.

11. The process of claim 9 wherein the HF-containing gas is at a temperature of about 15° to 70°C., the gas is passed through the support material at a superficial velocity of about 0.1 to 5 feet per second, and the support material is a bed of particles from about 0.5 to 8 inches in depth.

12. The process of claim 11 wherein the support material contains a statistical monomolecular layer of NaOH.

13. The process of claim 8 wherein the gas contains particulates and is preliminarily processed through particulate removing means to remove particulates.

14. The process of claim 13 wherein the particulates include particulates of alumina, cryolite, aluminum fluoride, and sodium fluoride, and the reusable particles are introduced into the molten electrolytic bath.

15. A process for removing gaseous HF from gas containing it comprising contacting the gas containing HF with a material consisting essentially of alumina and about 4 to 30 parts per 100 parts of alumina, of a component selected from the group consisting of NaOH, KOH and their mixtures.

16. The process of claim 15 in which the alumina has about 4 to 30 parts of NaOH per 100 parts of alumina.

17. The process of claim 15 in which the alumina has about 5 to 15 parts of NaOH per 100 parts of alumina.

18. The process of claim 15 in which the alumina contains a statistical monomolecular layer of NaOH.

19. The process of claim 17 in which the HF-containing gas is at a temperature of about 15° to 70°C., the gas is passed through said material at a superficial velocity of about 0.1 to 5 feet per second, and said material is a bed of particles from about 0.5 to 8 inches in depth.

20. The process of claim 19 in which the alumina contains a statistical monomolecular layer of NaOH.

21. The process of claim 16 wherein the support material is produced from an agglomerate of pot line alumina particles selected from the group consisting of activated alumina, low alpha-alumina and calcined alumina by mixing the alumina particles with the NaOH solution to coat the particles with the solution; heating the mix in a sealed vessel at a temperature and for a time sufficient to cohere the particles; unsealing the vessel to recover the agglomerate; and sizing the agglomerate into discrete NaOH treated alumina particles.

22. The process of claim 21 wherein the pot line alumina particles are of a size ranging from less than about 100 to 500 mesh; the mix is heated at a temperature from about 120° to 200°C. under autogeneous pressure; the agglomerate is recovered from the unsealed vessel, heated to remove free water and sized.

23. The process of claim 22 wherein the pot alumina is low alpha-alumina.

* * * * *